US011228353B2

(12) United States Patent
Raghavan et al.

(10) Patent No.: US 11,228,353 B2
(45) Date of Patent: Jan. 18, 2022

(54) BEAMFORMING IN NON-RECIPROCAL UPLINK AND DOWNLINK CHANNELS

(71) Applicant: QUALCOMM Incorporated, San Diego, CA (US)

(72) Inventors: Vasanthan Raghavan, West Windsor Township, NJ (US); Jung Ho Ryu, Fort Lee, NJ (US); Juergen Cezanne, Ocean Township, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/534,894

(22) Filed: Aug. 7, 2019

(65) Prior Publication Data

US 2020/0052756 A1 Feb. 13, 2020

Related U.S. Application Data

(60) Provisional application No. 62/716,789, filed on Aug. 9, 2018.

(51) Int. Cl.
*H04B 7/06* (2006.01)
*H04L 5/00* (2006.01)
*H04W 72/04* (2009.01)

(52) U.S. Cl.
CPC ......... *H04B 7/0617* (2013.01); *H04L 5/0048* (2013.01); *H04W 72/046* (2013.01)

(58) Field of Classification Search
CPC ... H04B 7/0456; H04B 7/0617; H04L 5/0048; H04W 72/046
See application file for complete search history.

(56) References Cited

U.S. PATENT DOCUMENTS 9,716,558 B1 * 7/2017 Buthler ............... H04W 52/367
2018/0102827 A1 4/2018 Noh et al.
(Continued)

FOREIGN PATENT DOCUMENTS

WO 2018064372 A1 4/2018

OTHER PUBLICATIONS

VIVO: "Beam management and beam reporting," 3GPP Draft; R1-1704488 Beam Management and Beam Reporting, 3rd Generation Partnership Project (3GPP), Mobile Competence Centre ; 650, Route Des Lucioles ; F-06921 Sophia-Antipolis Cedex ; France vol. RAN WGI, No. Spokane, Washington, USA; Apr. 3, 2017-Apr. 7, 2017 (Year: 2017).*

(Continued)

*Primary Examiner* — Elton Williams
(74) *Attorney, Agent, or Firm* — Haynes and Boone, LLP

(57) ABSTRACT

Wireless communications systems and methods related to determining an improved beam weight for UL and/or DL transmissions are provided. A wireless communication device transmits uplink-downlink beam reciprocity information and receives via an antenna array of the wireless communication device, a plurality of downlink beam reference signals based on a beam selection. The wireless communication device receives a downlink communication signal using a reception beam configured based on an adjusted plurality of weights. Additionally, the wireless communication device adjusts a plurality of weights for the antenna array based on the received plurality of downlink beam reference signals and the UL-DL beam reciprocity information.

29 Claims, 10 Drawing Sheets

(56) References Cited

U.S. PATENT DOCUMENTS

2018/0131434 A1 5/2018 Islam et al.
2019/0207731 A1* 7/2019 Park ................. H04B 7/0486

OTHER PUBLICATIONS

International Search Report and Written Opinion—PCT/US2019/045694—ISA/EPO—dated Oct. 29, 2019.
VIVO: "Beam Management and Beam Reporting", 3GPP Draft; R1-1704488 Beam Management and Beam Reporting, 3rd Generation Partnership Project (3GPP), Mobile Competence Centre; 650, Route Des Lucioles; F-06921 Sophia-Antipolis Cedex; France, vol. RAN WG1, No. Spokane, Washington, USA; Apr. 3, 2017-Apr. 7, 2017, Apr. 2, 2017, XP051242632, 7 pages, Retrieved from the Internet: URL: http://www.3gpp.org/ftp/Meetings_3GPP_SYNC/RAN1/Docs/ [retrieved on Apr. 2, 2017] pp. 2, 3; figures 3, 4, 5.

* cited by examiner

BEAMFORMING IN NON-RECIPROCAL UPLINK AND DOWNLINK CHANNELS

CROSS REFERENCE TO RELATED APPLICATIONS & PRIORITY CLAIM

The present application claims priority to and the benefit of the U.S. Provisional Patent Application No. 62/716,789 filed Aug. 9, 2018, which is hereby incorporated by reference in their entirety.

TECHNICAL FIELD

This application relates to wireless communication systems, and more particularly to improving transmission performance by performing multi-directional beamforming to account for non-reciprocity between uplink (UL) channels and downlink (DL) channels among eNBs and user equipments (UEs). Embodiments enable and provide solutions and techniques for improving resource utilization efficiency and beamforming.

INTRODUCTION

A wireless communication network may include a number of base stations (BSs) that can support communication for a number of user equipments (UEs). In Long Term Evolution (LTE), BSs are referred to as evolved NodeBs (eNBs). In recent years, the carrier frequencies at which BSs and UEs communicate have continued to increase and include larger bandwidths. To take advantage of these higher frequencies, more antennas in the same physical space have been used. For these higher frequency bands to be useful and approximate the same coverage radius as prior technologies (such as 2G, 3G, or 4G), however, one approach has been to improve beam forming gain and deliver more accurate beamformed transmissions.

Reciprocity describes the ability for a station to use information (such as a multipath delay profile) from one channel (e.g., the DL) in making determinations regarding another channel (e.g., the UL). In time-division duplexing (TDD) systems, after circuit mismatches have been compensated, the physical UL channel and the physical DL channel are identical (or transpositions of each other from a matrix algebra perspective) since UL and DL operate in the same frequency band. For example, BSs may compute UL channel estimates based on UL reference signals such as sounding reference signals (SRSs) transmitted by UEs and use the UL channel estimates for DL beamforming. In another example, the UE may compute DL channel estimates based on SS block (SSB) or channel state information—reference signals (CSI-RS) transmissions transmitted from the BS and use this information for UL channel estimates in UL transmissions. However, in practice, a communication channel between a pair of nodes (e.g., a BS and a UE) includes not only the physical channel, but also radio frequency (RF) transceiver chains, for example, including antennas, low-noise amplifiers (LNAs), mixers, RF filters, and analog-to-digital (A/D) converters, and in-phase quadrature-phase (I/Q) imbalances, which may be different between different nodes and/or different antennas. Thus, each node can introduce a mismatch, for example, in amplitude and/or phase, to transmitted and/or received signals. The mismatch may impact performance of channel reciprocity-based transmissions.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Embodiments of the present disclosure provide mechanisms for determining improved beam weights for use in communication between a user equipment (UE) and a base station (BS). The BS may select a beam that it perceives as being the best beam for DL communications with the UE and the UE may select an antenna array that the UE perceives as being the best for communication with the BS. Due to various factors, the DL and UL channels may lack reciprocity for various reasons. Example scenarios in which the DL and UL channels may lack reciprocity include use of poor RF components on either the DL or the UL, poor calibration efforts to adjust the DL/UL circuitry, drift of component behavior with time, temperature, and other parameters, etc. If the UL and DL channels are not reciprocal of each other, however, the directional beam on the DL may not be the best beam for use on UL transmissions. Accordingly, it may be advantageous for the UE to determine an improved beam weight to use for UL transmissions. In an example, the UE may receive via an antenna array of the UE a plurality of DL signals based on the BS's beam selection and adjust a plurality of weights for the antenna array based on the received plurality of DL beam reference signals. As discussed in the present disclosure, the UE may use various techniques for adjusting the plurality of weights. The UE receives from the BS a downlink communication signal using a reception beam configured based on the adjusted plurality of weights.

For example, in an aspect of the disclosure, a method of wireless communication includes communicating, by a user equipment (UE) with a base station (BS), uplink-downlink beam reciprocity information; receiving, by the UE from the BS via an antenna array of the UE, a plurality of downlink beam reference signals based on a beam selection; adjusting, by the UE, a plurality of weights for the antenna array based on the received plurality of downlink beam reference signals and the uplink-downlink beam reciprocity information; and receiving, by the UE from the BS, a downlink communication signal using a reception beam configured based on the adjusted plurality of weights.

In an additional aspect of the disclosure, a method of wireless communication includes communicating, by a base station (BS) with a user equipment (UE), uplink-downlink beam reciprocity information; transmitting, by the BS to the UE, a plurality of downlink beam reference signals based on a beam selection for a beam weight adjustment; receiving, by the BS from the UE via an antenna array of the BS, an uplink reference signal beamformed based on the beam weight adjustment and the uplink-downlink beam reciprocity information; adjusting, by the BS, a plurality of weights for the antenna array based on the uplink reference signal; and transmitting, by the BS to the UE, a downlink communication signal using a transmission beam configured based on the adjusted plurality of weights.

In an additional aspect of the disclosure, a UE includes a transmitter configured to transmit, from a wireless communication device, uplink-downlink beam reciprocity information; a receiver configured to receive, by the wireless communication device via an antenna array of the UE, a plurality of downlink beam reference signals based on a beam selection and further configured to receive, by the wireless communication device, a downlink communication signal using a reception beam configured based on an adjusted plurality of weights; and a processor configured to adjust, by the wireless communication device, a plurality of weights for the antenna array based on the received plurality of downlink beams and the uplink-downlink beam reciprocity information.

In an additional aspect of the disclosure, a BS includes a receiver configured to receive, by a wireless communication device, uplink-downlink beam reciprocity information and further configured to receive, by the wireless communication device, an uplink reference signal beamformed based on a beam weight adjustment and the uplink-downlink beam reciprocity information; a transmitter configured to transmit, from a wireless communication device, a plurality of downlink beam reference signals based on a beam selection for the beam weight adjustment and further configured to transmit, by the wireless communication device, a downlink communication signal using a transmission beam configured based on an adjusted plurality of weights; and a processor configured to adjust, by the wireless communication device, a plurality of weights for the antenna array based on the uplink reference signal.

In an additional aspect of the disclosure, a computer-readable medium having program code recorded thereon. The program code includes code for causing a user equipment (UE) to communicate uplink-downlink beam reciprocity information; code for causing the UE to receive via an antenna array of the UE, a plurality of downlink beam reference signals based on a beam selection; code for causing the UE to adjust a plurality of weights for the antenna array based on the received plurality of downlink beams and the uplink-downlink beam reciprocity information; and code for causing the UE to receive a downlink communication signal using a reception beam configured based on the adjusted plurality of weights.

In an additional aspect of the disclosure, a computer-readable medium having program code recorded thereon. The program code includes code for causing a base station (BS) to communicate uplink-downlink beam reciprocity information; code for causing the BS to transmit a plurality of downlink beam reference signals based on the beam selection for a beam weight adjustment; code for causing the BS to receive via an antenna array of the BS, an uplink reference signal beamformed based on the beam weight adjustment and the uplink-downlink beam reciprocity information; code for causing the BS to adjust a plurality of weights for the antenna array based on the uplink reference signal; and code for causing the BS to transmit a downlink communication signal using a transmission beam configured based on the adjusted plurality of weights.

In an additional aspect of the disclosure, an apparatus includes means for communicating, by a wireless communication device, uplink-downlink beam reciprocity information; means for receiving, by the wireless communication device via an antenna array of the wireless communication device, a plurality of downlink beam reference signals based on a beam selection; means for adjusting, by the wireless communication device, a plurality of weights for the antenna array based on the received plurality of downlink beam reference signals and the uplink-downlink beam reciprocity information; and means for receiving, by the wireless communication device, a downlink communication signal using a reception beam configured based on the adjusted plurality of weights.

In an additional aspect of the disclosure, an apparatus includes means for communicating, by a wireless communication device, uplink-downlink beam reciprocity information; means for transmitting, by the wireless communication device, a plurality of downlink beam reference signals based on a beam selection for a beam weight adjustment; means for receiving, by the wireless communication device via an antenna array of the wireless communication device, an uplink reference signal beamformed based on the beam weight adjustment and the uplink-downlink beam reciprocity information; means for adjusting, by the wireless communication device, a plurality of weights for the antenna array based on the uplink reference signal; and means for transmitting, by the wireless communication device, a downlink communication signal using a transmission beam configured based on the adjusted plurality of weights.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
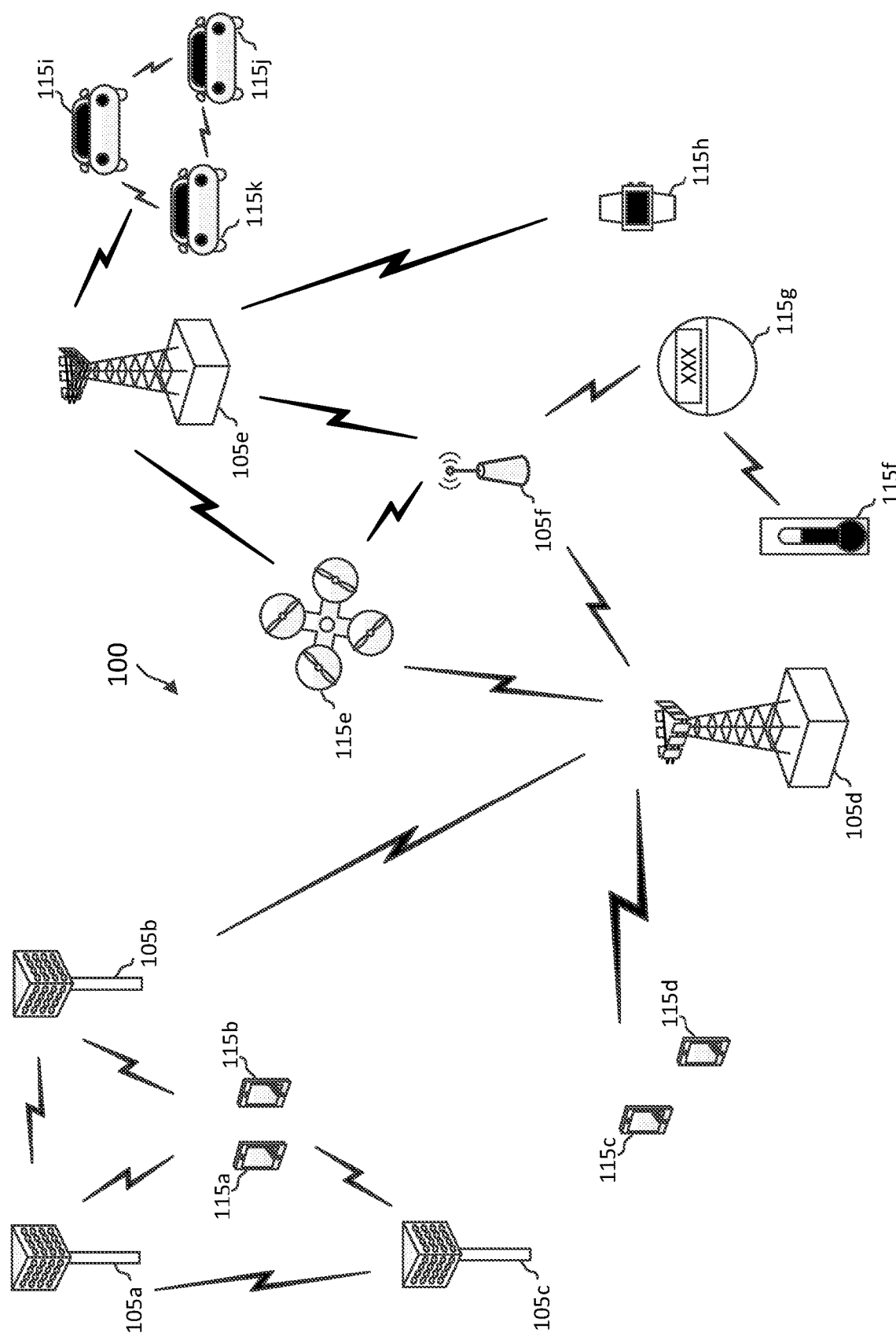
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like BW. For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). The "3rd Generation Partnership Project" (3GPP) Long Term Evolution (LTE) and LTE-Advanced (LTE-A) are new releases of UMTS that use E-UTRA. UTRA, E-UTRA, UMTS, LTE, LTE-A and GSM are described in documents from an organization named the "3rd Generation Partnership Project." CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network.

The present disclosure describes determining an improved beam weight for use in communication between a user equipment (UE) and a base station (BS). The BS may select a beam that it perceives as being the best beam for DL communications with the UE and the UE may select an antenna array that the UE perceives as being the best for communication with the BS. Due to various factors, the DL and UL channels may lack reciprocity. If the UL and DL channels are not reciprocal of each other, however, the directional beam on the DL may not be the best beam for use on UL transmissions. Accordingly, it may be advantageous for the UE to determine an improved beam weight to use for UL transmissions. In an example, the UE may receive via an antenna array of the UE a plurality of downlink (DL) reference signals based on the BS's beam selection and adjust a plurality of weights for the antenna array based on the received plurality of DL beams. As discussed in the present disclosure, the UE may use various techniques for adjusting the plurality of weights. The UE receives from the BS a DL communication signal using a reception beam configured based on the adjusted plurality of weights.

A single dominant direction may be insufficient at either the BS and/or the UE end for diversity/rate reasons. It may be desirable to consider more enhanced beamforming scenarios in which beams are pointed in multiple directions because they may capture energy from two different directions at the same time. An alternate set of baseline UL procedures similar to that described for DL (see discussion for FIGS. 2A, 2B, and 2C below) for UL beam training in the case of non-idealities may be implemented in the beams at the BS side and the UE side. The baseline approach of beamforming on the UL involves scanning all of the beams at the BS side and at the UE side more than once, resulting in overhead, latency, complexity, and high-power consumption.

Aspects of the present disclosure can provide several benefits over the baseline approach. For example, use of the improved beam weights for UL transmissions discussed in the present disclosure is faster than the baseline approach of codebook-based/directional beamforming on the UL. For example, it may be unnecessary to scan the beams at the UE and BS sides again (see FIGS. 2A and 2B) and for each of the UE and BS to select a beam. Additionally, NR frequency bands may have high path loss and may be less stable than the LTE UL frequency bands due to high frequencies. Thus, use of the improved weight beam for UL communications can improve NR network UL coverage. Moreover, the disclosed embodiments provide the opportunity for devices to communicate using Frequency Division Duplex (FDD) Bands in FR-2 rather than communicating using only TDD for FR-2, as is the case with the baseline approach.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of 3 dimension (3D), full dimension (FD), or massive Multiple Input-Multiple Output (MIMO). The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmit multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/frequency-division duplexing (FDD) communications, such as in a vehicle-to-vehicle (V2V) communication.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of transmission time intervals (TTIs) may be scalable.

In an embodiment, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than DL communication.

In some embodiments, the BS 105 can coordinate with the UE 115 to cooperatively schedule, beamform, and/or transmit data in the network 100. Substantial gain may be achieved through greater use of a multiple antenna system. In mmWave access, for example, a large number of antenna elements may be used to take advantage of shorter wavelengths, and to enable beamforming and beam-tracking. Beamforming may be used to avoid transmission losses when using, for example, mmWave frequencies. Beamforming combines signals from multiple antenna elements in an antenna array, so that the combined signal level increases when several signal phases align (constructive interference). The signals from each antenna element are transmitted with a slightly different phase (delay) to produce a narrow beam directed towards the receiver.

Figure 2A:
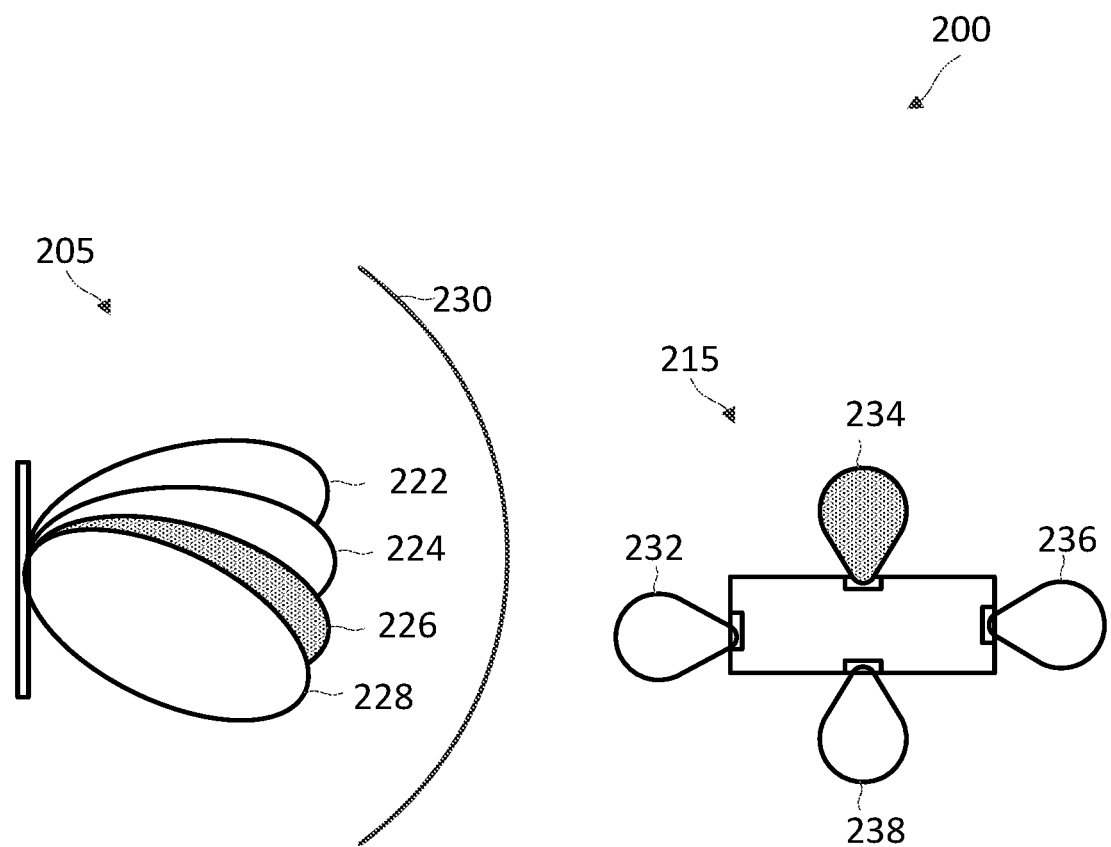
FIGS. 2A, 2B, and 2C illustrate a hierarchical beamforming method that performs directional communication over suitable frequencies according to embodiments of the present disclosure.
Figure 2B:
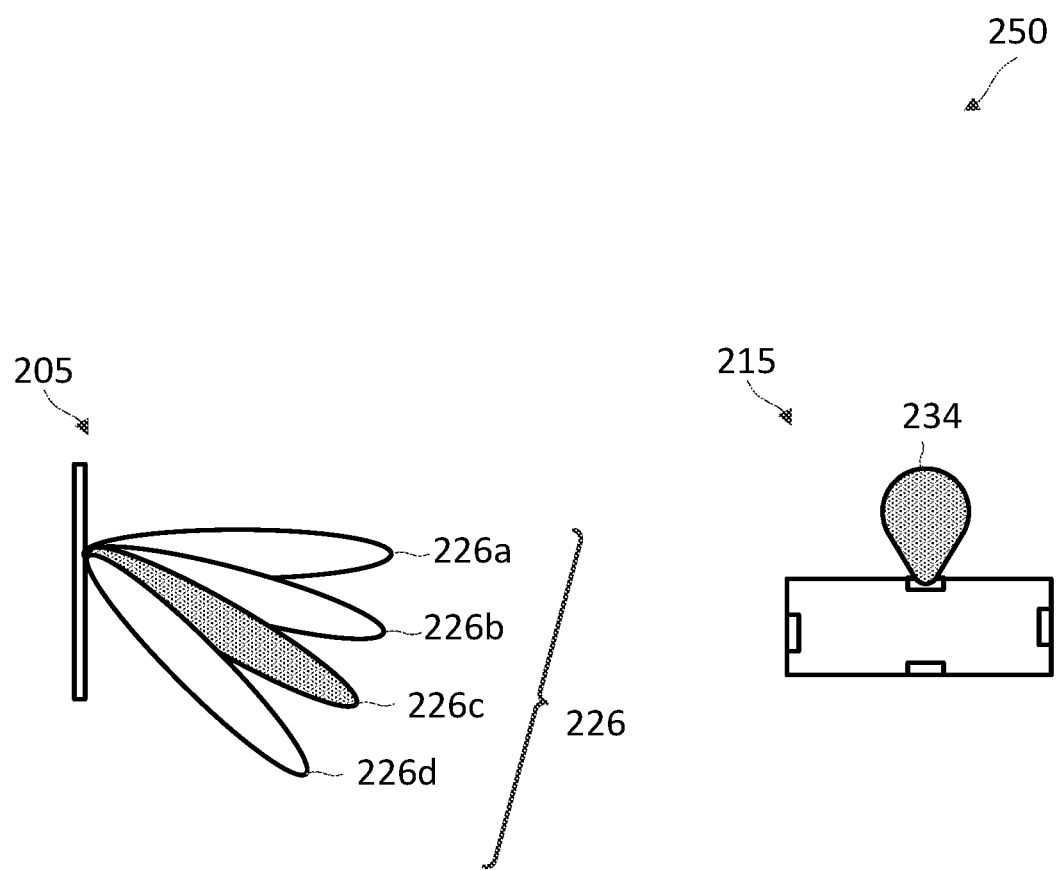

Beam management operations are based on the control messages that are periodically exchanged between the transmitter and the receiver nodes. FIGS. 2A and 2B illustrate a hierarchical beamforming method 200, 250 that performs directional communication over suitable frequencies according to embodiments of the present disclosure. FIGS. 2A and 2B illustrate a BS 205 and a UE 215 for purposes of simplicity of discussion, though it will be recognized that embodiments of the present disclosure may scale to many more UEs 215 and/or BSs 205. The BS 205 corresponds to the BSs 105. The UE 215 corresponds to the UEs 115. The UE 215 and the BS 205 may communicate with each other at any suitable frequencies, such as mmWave frequencies.

At higher frequencies, propagation and penetration losses are higher. Beamforming techniques may be used to increase the signal level received by a device. A beamformer combines energy over its aperture, obtaining a certain antenna gain in a given direction while having attenuation in others.

Each of the BS 205 and the UE 215 may steer its energy in a particular direction. In FIG. 2A, BS 205 transmits broad beams 222, 224, 226, and 228 corresponding to an angle 230. In an example, the angle 230 is 120 degrees, and thus the beams 222, 224, 226, and 228 cover a 120-degree sector. The angle 230 may be an angle of departure from the BS 105 to a dominant cluster in the channel.

The UE 215's direction is focused towards the same corresponding dominant cluster in the channel as that mentioned for the BS 205. The UE 215 is designed with subarrays 232, 234, 236, and 238, and each subarray includes an array of antennas (e.g., four antennas). A "subarray" may also be referred to as an "array" in the present disclosure. The subarrays 232, 234, 236, and 238 are located on different edges of the UE 215, thus creating diversity and providing for directional communication. The mode of communication (e.g., pseudo-omnidirectional) between the BS 205 and the UE 215 depends on the carrier frequency. In FIG. 2A, as represented by the patterns within the beam 226 and the subarray 234, the BS 205 selects the beam 226 as having the largest receive signal power compared to the other beams 222, 224, and 228, and the UE 215 selects the subarray 234 as having the largest receive signal power compared to the other subarrays 232, 236, and 238. For example, the BS 205 and the UE 215 may exchange reference signals for receive signal power measurements. The receive signal powers can be referred to as reference signal receive powers (RSRPs).

The BS 205's selected beam may be further divided into a plurality of narrower beams. As shown in FIG. 2B, the BS 205's selected beam 226 is divided into four narrow beams 226a, 226b, 226c, and 226d. At the UE 215 side, pseudo-omnidirectional or wide beams may be used per subarray and may have a low gain. The pseudo-omnidirectional or wide beams cover the coverage area of each subarray. From the narrow beams 226a, 226b, 226c, and 226d, the BS 205 selects the narrow beam 226c as having the largest receive signal power compared to the other beams 226a, 226b, and 226d (as represented by the patterns within the narrow beam 226c). The BS 205 performs narrow beam refinement of the selected beam 226c with the UE 215's selected subarray 234.

Figure 2C:
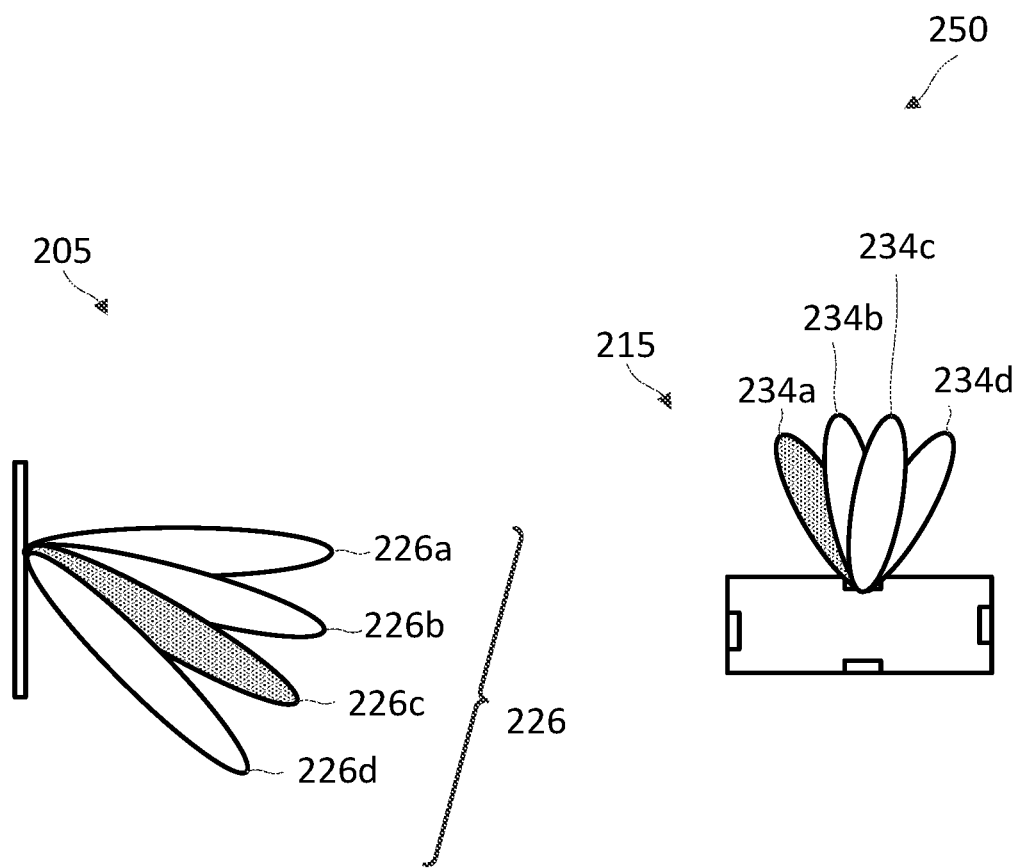

FIG. 2C illustrates four narrow beams 234a, 234b, 234c, and 234d of the UE 215's selected subarray 234. The UE 215 uses the BS 205's selected narrow beam 226c to perform narrow beam refinement of the selected subarray 234. The UE 215 may receive energy or reference symbols (e.g., reference signals) and select the narrow beam 234a as having the best direction for energy compared to beams 234b, 234c, and 234d (as represented by the patterns within the narrow beam 234a).

The BS 205 and UE 215 may communicate DL information using the selected beams 226c and 234a. In particular, the BS 205 transmits the DL information and the UE 215 receives the DL information using the selected beams 226c and 234a.

Subsequently, when the UE 215 transmits UL information, the UE 215 may set the beam weight corresponding to the same direction as narrow beam 234a and transmit UL data on the beam weight, assuming it has reciprocity. In some examples, $H_{DL}$ denotes the DL channel matrix between the BS 205 and the UE 215, and $H_{UL}$ denotes the UL channel matrix between the UE 215 and the BS 205. If the UL and DL beams have true or perfect beam correspondence (100% reciprocity between the UL and DL channels), the transpose of $H_{DL}$ corresponds to $H_{UL}$, which may be represented by the equation: $H_{DL} = (H_{UL})^T$. If the UL and DL channels are not reciprocal of each other, however, the directional beam on the DL may not be the best beam for use on UL transmissions. The DL directional beam may not be sufficient for the desired objectives on the UL transmission. The DL beam can be "directional" offering a certain rate and/or robustness on the DL transmission, but it may be desirable for the UL beam to be better for UL-specific rate and/or robustness considerations. In another example, the DL beam cannot be used on the UL when beam correspondence or reciprocity fails. The directional beam on the DL transmission may not be the best beam for UL transmissions for various reasons, such as the DL/UL circuit and active impedance mismatches, poor calibration that does not resolve all the phase/amplitude ambiguities, etc. Poor calibration on DL and/or UL or circuit mismatches or circuit drifts with time can lead to poor beam correspondence. Accordingly, it may be undesirable to blindly reuse the beam weights from a certain DL sub-band/common carrier in a different UL sub-band/common carrier of operation.

The present disclosure provides techniques for leveraging the information collected from the BS 205's selection of the narrow beam 226c and the UE 215's selection of the narrow beam 234a to use on an UL transmission. For example, the present disclosure provides techniques for obtaining improved beam weights without relying on beam correspondence or reciprocity between the UL and DL transmission. Additionally, the present disclosure provides considerations for FDD in FR-2, not only TDD for FR-2 (e.g., 24250 MHz to 52600 MHz).

Figure 3:
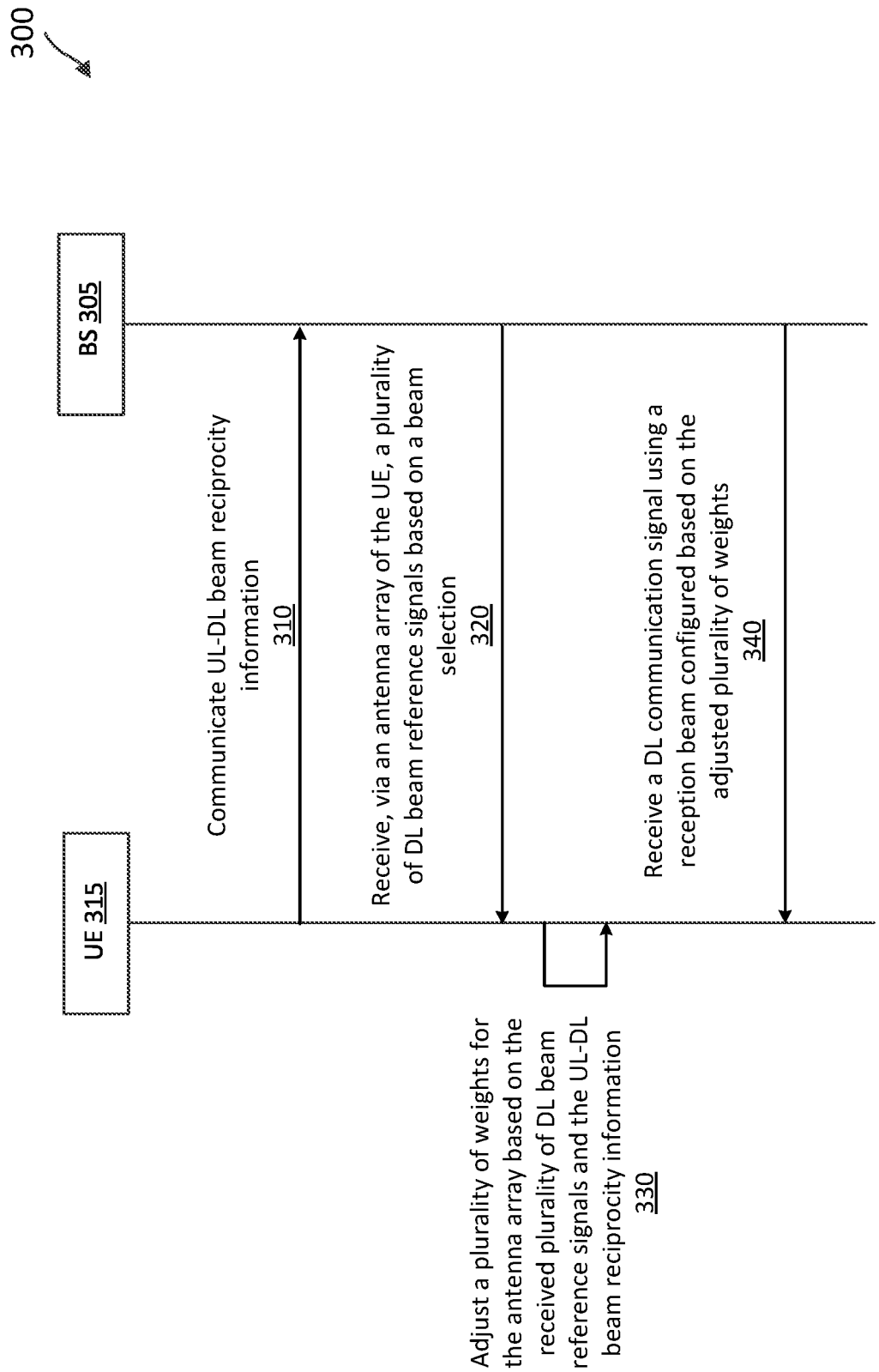
FIG. 3 illustrates a hierarchical beamforming method that performs directional communication over suitable frequencies according to embodiments of the present disclosure.

FIG. 3 illustrates a hierarchical beamforming method 300 that performs directional communication over suitable frequencies according to embodiments of the present disclosure. At step 310, the UE 315 communicates UL-DL beam reciprocity information. In one example, the communicating of the UL-DL beam reciprocity information occurs after a beam selection (e.g., a beam selection in the hierarchical beamforming method in FIGS. 2A-2C). In an example, the UL-DL beam reciprocity information includes the UE 315's capability information. The UE may provide feedback to the BS regarding whether the UE has reciprocity on the DL-UL channels. In some examples, the UE 315 quantizes the 0 to 100 percent spread in terms of beam correspondence into a bitmap, and provides the bitmap to the BS 305. In an example, the UE 315 uses a two-bit mapping providing the bits ([0][0]) if the beam correspondence is above 80%, the bits ([0][1]) if the beam correspondence is approximately 50-80%, the bits ([1][0]) if the beam correspondence is approximately 20-50%, and the bits ([1][1]) if the beam correspondence is less than 20%. The UE 315 may be aware of the UL-DL beam reciprocity information. In an example, the UL-DL beam reciprocity information may be a capability report indicating UL-DL mismatches due to circuit and/or impedance differences between a UL channel and a DL channel. In another example, the UL-DL beam reciprocity information may be a capability report including a multibit representation capturing the precise lack of correspondence between the DL channel and the UL channel, TDD or FDD, and/or the DL and UL band information. If the UE has high UL-DL reciprocity (e.g., at least 80%) with the BS, then the UE may speed up the beam training process. If, however, the UE does not have high UL-DL reciprocity with the BS, then the beam training process may be slow. In this example, the UE may speed up the beam training process by transmitting the capability report.

The BS has many possible actions to perform upon receiving information regarding the lack of beam correspondence from the UE. Based on what the BS 305 receives, it may help the UE with selecting a better beam for the UL transmission. In an example, the beam selection at step 310 refers to the UE's beam selection of the beam 234a in FIG. 2C.

In another example, the beam selection associated with step 310 refers to the BS 305's beam selection of beam 226c in FIG. 2B. The BS 305 may continue to use the same beam 226c for UL reception and DL transmission that the BS selected in FIG. 2B for use in the DL transmission, and the aforementioned beam may be referred to as a fixed beam f. Due to the ability to afford higher cost circuitry and to perform better calibration, it may be reasonable to assume that the fixed beam f can also serve as the UL beam at the UE 315.

As discussed in the present discussion, it may be desirable to determine improved UL beam weights for an N antenna subarray at the UE 305. The BS 305 may continue to transmit on the fixed beam f, and the UE 315 may use other sets of beams of the subarray 234 to determine the best UL beam weight for communication with the BS. After the BS has selected its fixed beam f and the UE has selected its beam at FIGS. 2B and 2C, respectively, the UE may continue its beam selection on the UE side to find an improved beam weight for use on the UL transmission.

At step 320, the UE 315 receives, via an antenna array of the UE 315, a plurality of DL beam reference signals based on a beam selection. The UE 315 may receive the DL beam reference signals over a continuous series of symbols (e.g., time periods). In an example, the beam selection is the BS 305's beam selection of beam 226c.

At step 330, the UE 315 adjusts a plurality of weights for the antenna array based on the received plurality of DL beam reference signals and the UL-DL beam reciprocity information. In an example, adjusting the plurality of weights includes determining, by the UE 315, an RSRP based on a set of weights for each of the plurality of DL beam reference signals and selecting, by the UE 315, a set of weights corresponding to a first RSRP greater than a second RSRP. The UE 315 may select the set of weights corresponding to the first RSRP over the second RSRP because the first RSRP has a higher quality signal than the second RSRP.

The plurality of DL beam reference signals are N training beams, where at least N training beams are used for an N antenna subarray at the UE side. In an example, $g_1, g_2, \ldots, g_N$ is a new set of UE-specific DL beams used at the UE side for the beam scanning or training under the assumption that the BS 305 uses the fixed beam f for the DL transmission. Any plurality of beams may be used such that $G = [g_1, g_2, \ldots, g_N]$ is unitary. Additionally, the $g_1, g_2, \ldots, g_N$ beams may be different from the beams selected in FIGS. 2B and 2C and are designed for enhancing the UE's beamforming capability after the aforementioned beams are selected.

In some examples, the UE 315 uses the same subarray 324 that was selected in FIG. 2B, and the $g_1, g_2, \ldots, g_N$ DL beams signals are different from the directional beams 234a, 234b, 234c, and 234d from FIG. 2C. Accordingly, while the BS 305 continues to use the same fixed beam f, the UE 315 may experiment with different DL beams to figure out the weighting for the $g_1, g_2, \ldots, g_N$ DL beam reference signals in order to find an improved beam for UL transmission.

The plurality of weights may be designed in a variety of ways. In an example, the beam steering direction may be provided by $G_1$, in which the antennas are scanned one column at a time and represented by the following equation, where the columns represent the training beams $g_i$ and the rows represent the weights for the antennas:

$$G_1 = \begin{bmatrix} 1 & 0 & 0 & 0 \\ 0 & 1 & 0 & 0 \\ 0 & 0 & 1 & 0 \\ 0 & 0 & 0 & 1 \end{bmatrix}. \tag{1}$$

The four columns in (1) correspond to the use of beam weights $g_1, g_2, g_3, g_4$ over four time instances. In $G_1$, the UE 305 directs all its energy into the first antenna and no energy in the second, third, or fourth antenna. In particular, the UE 305 selects the first antenna and determines the amount of energy received via the first antenna. At the second time, the UE 305 directs all its energy into the second antenna and no energy in the first, third, or fourth antenna. In particular, the UE 305 selects the second antenna and determines the amount of energy received via the second antenna, and so on with the third and fourth antennas. The UE 315 determines the RSRPs for each of the four antennas and adjusts the beam with the circuit mismatch factors to figure out a weight that is combined for all four antennas.

In another example, the beam steering direction may be provided by the following equation:

$$G_2 = \begin{bmatrix} 1 & 1 & 1 & 1 \\ 1 & -1 & 1 & -1 \\ 1 & 1 & -1 & -1 \\ 1 & -1 & -1 & 1 \end{bmatrix}. \tag{2}$$

In $G_2$, the UE 305 selects all four antennas over the four time units, and the antennas selected are orthogonal to each other.

In another example, the beam steering direction may be provided by the following equation:

$$G_3 = \begin{bmatrix} 1 & 1 & 1 & 1 \\ 1 & -1 & i & -i \\ 1 & 1 & -1 & -1 \\ 1 & -1 & -i & i \end{bmatrix}. \tag{3}$$

$G_3$ corresponds to beams steered towards 90 degrees, 0 degrees, 120 degrees, and 60 degrees in a certain global coordinate system with 90 degrees being the boresight direction.

In some examples, the UE 305 adjusts the plurality of weights based on a received signal power of the DL reference signals. In an example, the plurality of DL beams are in a same beam direction. In some examples, the UE 315 uses the N beams, $g_1, g_2, \ldots, g_N$, and performs an estimation in terms of RSRP (or some indication of signal strength received by the UE 315). Each $g_i$ has a corresponding $RSRP_i$. In an example, the UE 305 determines a Reference Signal Received Power (RSRP) based on the set of weights for each DL beam signal ($RSRP_1$ for $g_1$, $RSRP_2$ for $g_2$, $RSRP_3$ for $g_3$, and $RSRP_4$ for $g_4$).

It may be desirable to find a g to maximize the following equation:

$$|f^T(H_{UL})^T g^*|^2. \tag{4}$$

The solution may be also written as $(g_{opt})^T = \gamma \cdot f^T H_{UL}$ for some $\gamma$ to ensure that $g_{opt}$ is unit-norm. Accordingly, the following equations follow:

$$f^T(H_{UL}) \cdot [g_1^* \ldots g_N^*] \cdot$$

$$\begin{bmatrix} g_1^T \\ \vdots \\ g_N^T \end{bmatrix} = [\sqrt{RSRP_1} \cdot \alpha_1 \cdot e^{j\varphi_1} \ldots \sqrt{RSRP_N} \cdot \alpha_N \cdot e^{j\varphi_N}] \cdot \begin{bmatrix} g_1^T \\ \vdots \\ g_N^T \end{bmatrix} =$$

$$\sum_{i=1}^{N} \sqrt{RSRP_i} \cdot \alpha_i \cdot e^{j\varphi_i} \cdot g_i^T,$$

where $\alpha_i$ represent a set of amplitude factors and $\varphi_i$ represent a set of phase factors due to transmit-receive circuit mismatches and/or UL-DL band differences.

$$\rightarrow f^T(H_{UL}) = \Sigma_{i=1}^{N}\sqrt{RSRP_i} \cdot \alpha_i \cdot e^{j\varphi_i} \cdot g_i^T \cdot (G^*G^T)^{-1}, \quad (5)$$

That is, $g_{opt}$ is a linear combination of the training beams $g_i$ used in the scanning after the BS and UE selected their respective beams in FIGS. 2B and 2C. Accordingly, the following equation follows:

$$g_{opt} = \frac{(GG^H)^{-1} \cdot \sum_{i=1}^{N} \sqrt{RSRP_i} \cdot \alpha_i \cdot e^{j\varphi_i} \cdot g_i}{\left\| (GG^H)^{-1} \cdot \sum_{i=1}^{N} \sqrt{RSRP_i} \cdot \alpha_i \cdot e^{j\varphi_i} \cdot g_i \right\|} \quad (6)$$

Additionally, $RSRP_i = |g_i^H H_{DL} f|^2$, where $RSRP_i$ is the RSRP associated with DL beam scanning corresponding to $g_i$ and f. Additionally, the following equation holds true on the same band (up to noise in the beam scanning process, wideband/phase noise effects, and a link-margin related constant factor): $|g_i^H H_{DL} f|^2 = |f^T(H_{DL})^T g_i^*|^2 = |f^T H_{UL} g_i^*|^2$. The RSRPs may be adjusted by UL/DL circuit mismatches, and the beam weights $g_1, g_2, \ldots, g_N$ may be used for beam training.

After the UE 315 receives each of the $RSRP_i$ for $g_i$ the UE 315 may collect information based on $RSRP_1, \ldots, RSRP_N$, regarding the transmit and receive circuitry at the UE side. The UE 305 may measure the beam-specific RSRP for each beam and/or determine additional information in terms of circuit mismatches, and eventually use this information to produce an improved beam that the UE uses for transmission of UL data. The information may be used to adjust along with the $RSRP_1, \ldots, RSRP_N$, the improved UL beam.

The UE 315 uses a weighted combination of the beam weights for the UL transmission. In this way, the UE 315 may leverage its knowledge from the DL beam selection in FIGS. 2B and 2C and the circuit mismatches. By leveraging the information from the DL beam estimation along with the circuit mismatches, the UE 315 may use a finite number of symbols to obtain the beam weights for the UL transmission.

In some examples, the UE 305 adjusts a plurality of weights for the antenna array based on the largest receive signal power on the received plurality of DL beams. In some examples, the UE 305 adjusts a plurality of weights for the antenna array based on at least one of an amplitude difference between the UL and DL channels or at least one of a phase difference between the UL and DL channels. An amplitude and/or phase on the DL channel will correspond to an amplitude and/or phase adjustment on the UL channel that captures for the same beams. Correction factors for the amplitude and/or phase may depend on whether operation is on the same or different carriers.

Any disparity between DL and UL (or different bands of operation) are captured by amplitude factors $\alpha_1, \ldots, \alpha_N$ and phase factors $\varphi_1, \ldots, \varphi_N$. For a different UL band of operation, the following equation holds: $f^T H_{UL'} g_i^* = \sqrt{RSRP_i'} \alpha_i' \cdot e^{j\varphi_i'}$, for some amplitude factors $\alpha_i', \ldots, \alpha_N'$ and a different set of phase factors $\varphi_1', \ldots, \varphi_N'$. These amplitude and phase factors depend on circuit and/or impedance mismatches and do not vary with time. Accordingly, these factors capture the UL-DL correspondence and can be learned offline or a priori with training symbols (over all possible gNB-side beams and UE side beams). In an example, the UE receives a set of offline designed beams over a contiguous series of symbols and records the RSRPs over these symbols. The number of offline designed beams may be at least as large as the number of antennas in the UE's selected subarray 234 in reference to FIG. 2C. In another example, the offline designed beams may have certain properties such as equal gain, orthogonality, or being unitary. Additionally, the offline designed beams may be a per-antenna sampling or a different set of directional beams.

Additionally, they remain dependent on only circuit variations and hence may capture UL-DL relationships. The above equations may be captured as the following:

$$f^T H_{UL'}[g_1^* \ldots g_N^*] = \sqrt{RSRP_1'} \cdot \alpha_1' \cdot e^{j\varphi_1'} \ldots \sqrt{RSRP_N'} \cdot \alpha_N' \cdot e^{j\varphi_N'}$$

At step 340, the UE 315 receives a DL communication signal using a reception beam configured based on the adjusted plurality of weights. In an example, the UE 315 transmits an SRS to the BS 305, and the DL communication signal is beamformed based on the SRS.

Figure 4:
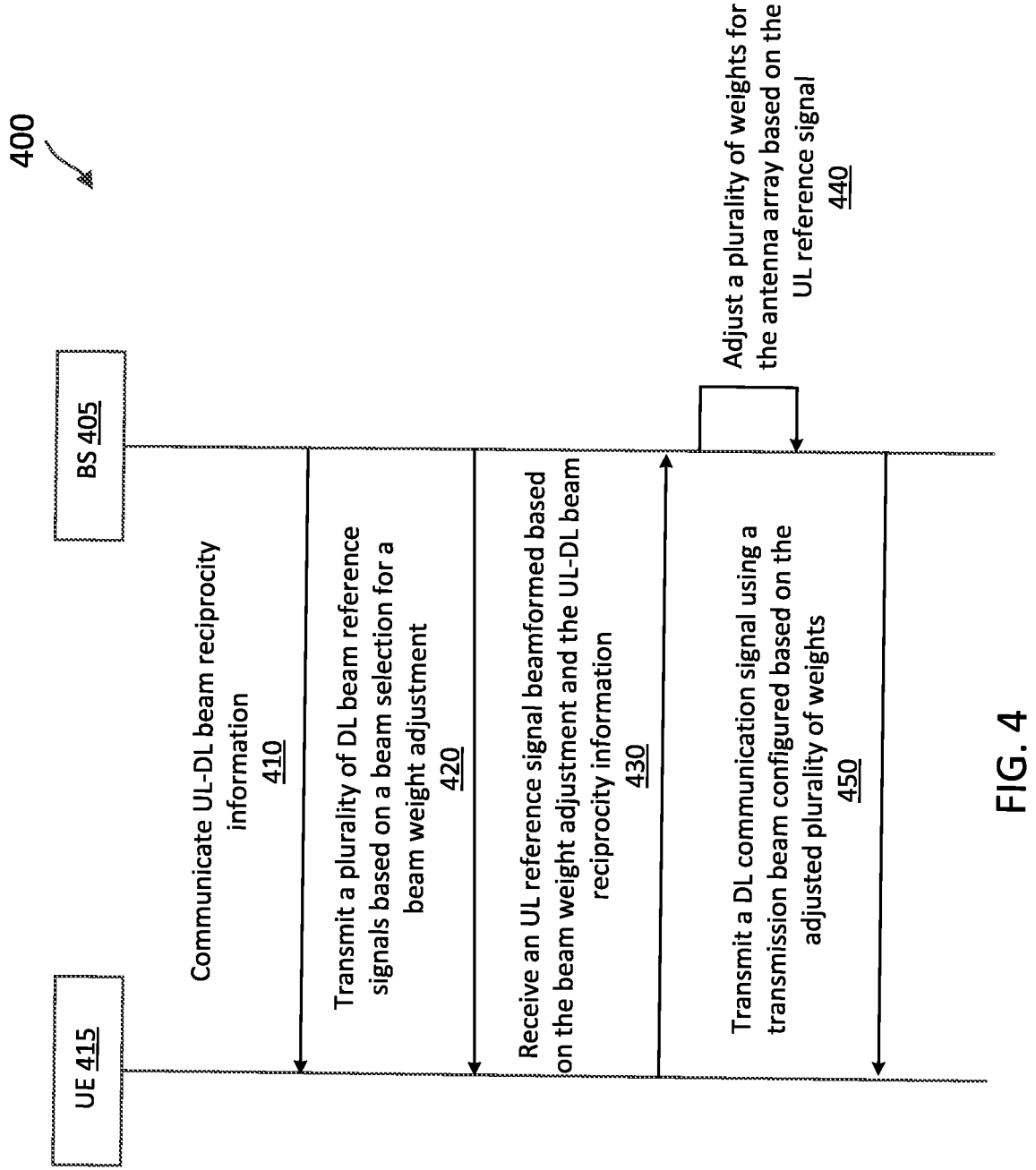
FIG. 4 illustrates a hierarchical beamforming method that performs directional communication over suitable frequencies according to embodiments of the present disclosure.

FIG. 4 illustrates a hierarchical beamforming method 400 that performs directional communication over suitable frequencies according to embodiments of the present disclosure. At step 410, the BS 405 communicates UL-DL beam reciprocity information. In one example, the communicating of the UL-DL beam reciprocity information occurs after a beam selection. In an example, the UL-DL beam reciprocity information is a request by the BS 405 for a beam refinement procedure. The beam selection may be selection of the beam 226c from FIG. 2B. The beam selection may be selection of the beam 234a from FIG. 2C.

At step 420, the BS 405 transmits a plurality of DL beam reference signals based on a beam selection for a beam weight adjustment. In an example, the transmission of the plurality of DL beam reference signals at step 420 corresponds to the UE receiving, via an antenna array of the UE, the plurality of DL beam reference signals based on the beam selection at step 320 in FIG. 3.

At step 430, the BS 405 receives from the UE via an antenna array of the BS, an UL reference signal beamformed based on the beam weight adjustment and the UL-DL beam reciprocity information. In an example, receiving the UL reference signal at step 430 corresponds to the UE using an improved beam weight for transmission of UL data to the BS.

At step 440, the BS 405 adjusts a plurality of weights for the antenna array based on the UL reference signal. The BS may use the fixed beam f for a period of time while UE determines its improved beam weight for UL transmission. After the UE 415 determines the improved beam $g_{opt}$ for use on the UL channel, the BS 405 may determine an improved beam that matches with the $g_{opt}$ rather than use the fixed beam f from the DL transmission. The BS 405 may use the techniques discussed above in relation to the UE for adjusting the plurality of weights at step 440. For example, the BS 405 may adjust the plurality of weights based on RSRP of the UL beam signal (received at step 430), the largest receive signal power, and/or based on at least one of a signal amplitude difference between the UL and DL or a phase difference between the UL and DL. In an example, adjusting the plurality of weights includes determining, by the BS 405, an RSRP based on a set of weights for the UL reference signal and selecting, by the BS 405, a set of weights corresponding to a first RSRP greater than a second RSRP. The BS 405 may select the set of weights corresponding to the first RSRP over the second RSRP because the first RSRP has a higher quality signal than the second RSRP.

At step 450, the BS 405 transmits a DL communication signal using a transmission beam configured based on the adjusted plurality of weights.

Figure 5:
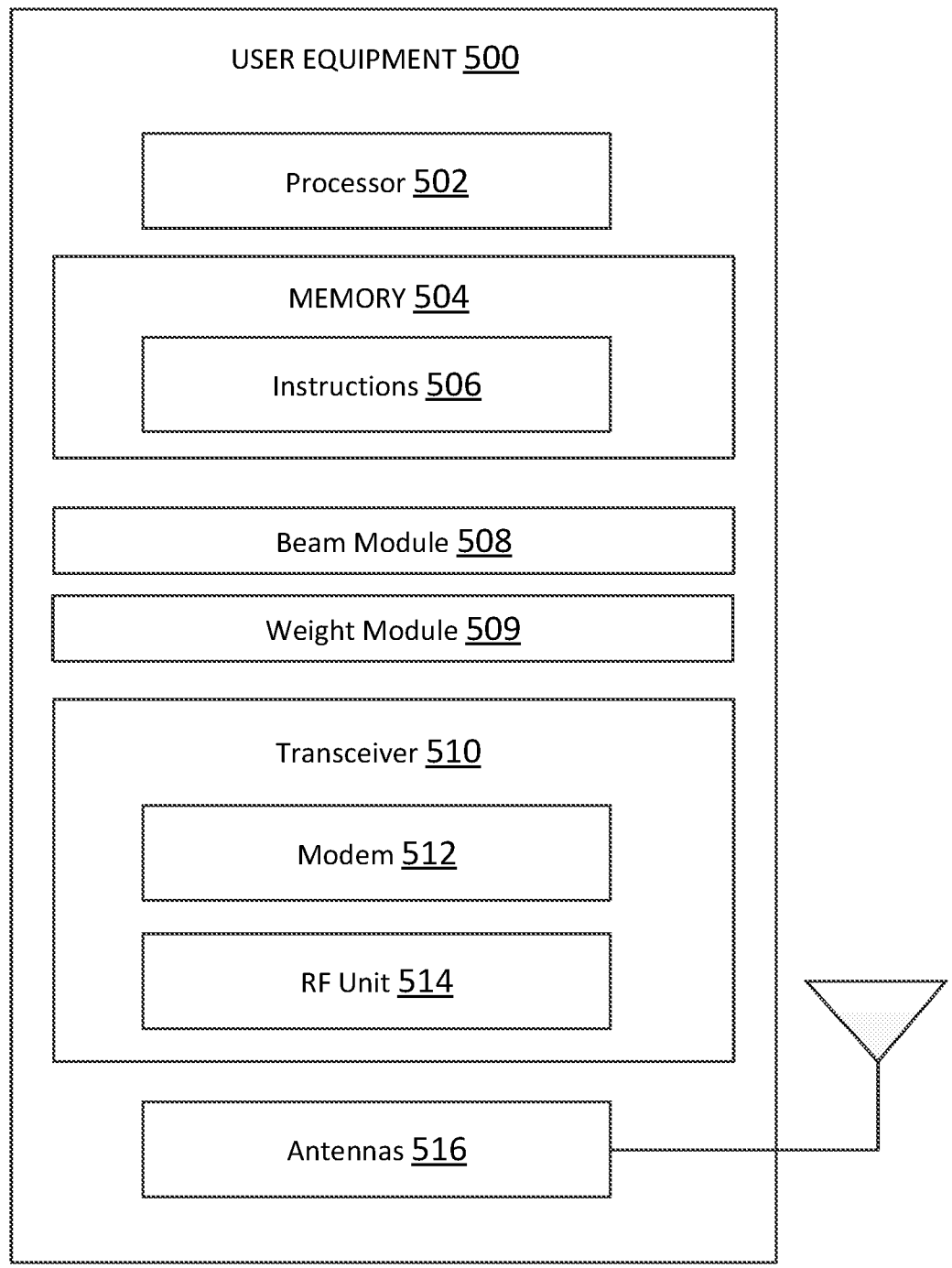
FIG. 5 is a block diagram of a user equipment (UE) according to embodiments of the present disclosure.

FIG. 5 is a block diagram of a UE 500 according to embodiments of the present disclosure. The UE 500 may be a UE 115, 215, 315, or 415 as discussed above. As shown, the UE 500 may include a processor 502, a memory 504, a beam module 508, a weight module 509, a transceiver 510 including a modem subsystem 512 and a RF unit 514, and an antenna 516. These elements may be in direct or indirect communication with each other, for example via one or more buses.

The processor 502 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 504 includes a non-transitory computer-readable medium. The memory 504 may store instructions 506. The instructions 506 may include instructions that, when executed by the processor 502, cause the processor 502 to perform the operations described herein with reference to the UEs 102 in connection with embodiments of the present disclosure. Instructions 506 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The beam module 508 and/or weight module 509 may be used for various aspects of the present disclosure. For example, the beam module 508 is configured to communicate with a BS, UL-DL beam reciprocity information. In an example, the beam module 508 provides feedback to the BS regarding whether the UE has reciprocity on the DL-UL channels. The beam module 508 is configured to receive from the BS via an antenna array of the UE, a plurality of DL beam reference signals based on a beam selection. In one example, the beam module 508 transmits the UL-DL beam reciprocity information after a beam selection by the BS or by the UE. In an example, the beam module 508 is configured to select a beam corresponding to the antenna array of the UE, and the beam module 508 transmits the UL-DL beam reciprocity information after the beam selection by the beam module 508. In another example, the BS selects the beam, and the beam module 508 transmits the UL-DL beam reciprocity information after the beam selection by the BS.

The weight module 509 is configured to adjust a plurality of weights for the antenna array based on the received plurality of DL beams and the UL-DL beam reciprocity information. In an example, the weight module 509 uses the plurality of DL beam reference signals to determine an improved beam weight as discussed in the disclosure. The beam module 508 is configured to receive from the BS a DL communication signal using a reception beam based on the adjusted plurality of weights. In an example, the beam module 508 transmits an SRS to the beam, where the DL communication signal is beamformed based on the SRS.

As shown, the transceiver 510 may include the modem subsystem 512 and the RF unit 514. The transceiver 510 can be configured to communicate bi-directionally with other devices, such as the BSs 105, 205, 305, and 405. The modem subsystem 512 may be configured to modulate and/or encode the data from the memory 504, the beam module 508 and/or weight module 509 according to a modulation and coding scheme (MCS), e.g., a low-density parity check (LDPC) coding scheme, a turbo coding scheme, a convolutional coding scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115 or a BS 105. Although shown as integrated together in transceiver 510, the modem subsystem 512 and the RF unit 514 may be separate devices that are coupled together at the UE 105 to enable the UE 105 to communicate with other devices.

The RF unit 514 may provide the modulated and/or processed data, e.g. data packets (or, more generally, data messages that may contain one or more data packets and other information), to the antenna 516 for transmission to one or more other devices. This may include, for example, transmission of UL-DL beam reciprocity information according to embodiments of the present disclosure. The antenna 516 may further receive data messages transmitted from other devices. This may include, for example, a plurality of DL beam reference signals based on a beam selection and a DL communication signal using a reception beam configured based on an adjusted plurality of weights according to embodiments of the present disclosure. The antenna 516 may provide the received data messages for processing and/or demodulation at the transceiver 510. Although FIG. 5 illustrates antenna 516 as a single antenna, antenna 516 may include multiple antennas of similar or different designs in order to sustain multiple transmission links.

Figure 6:
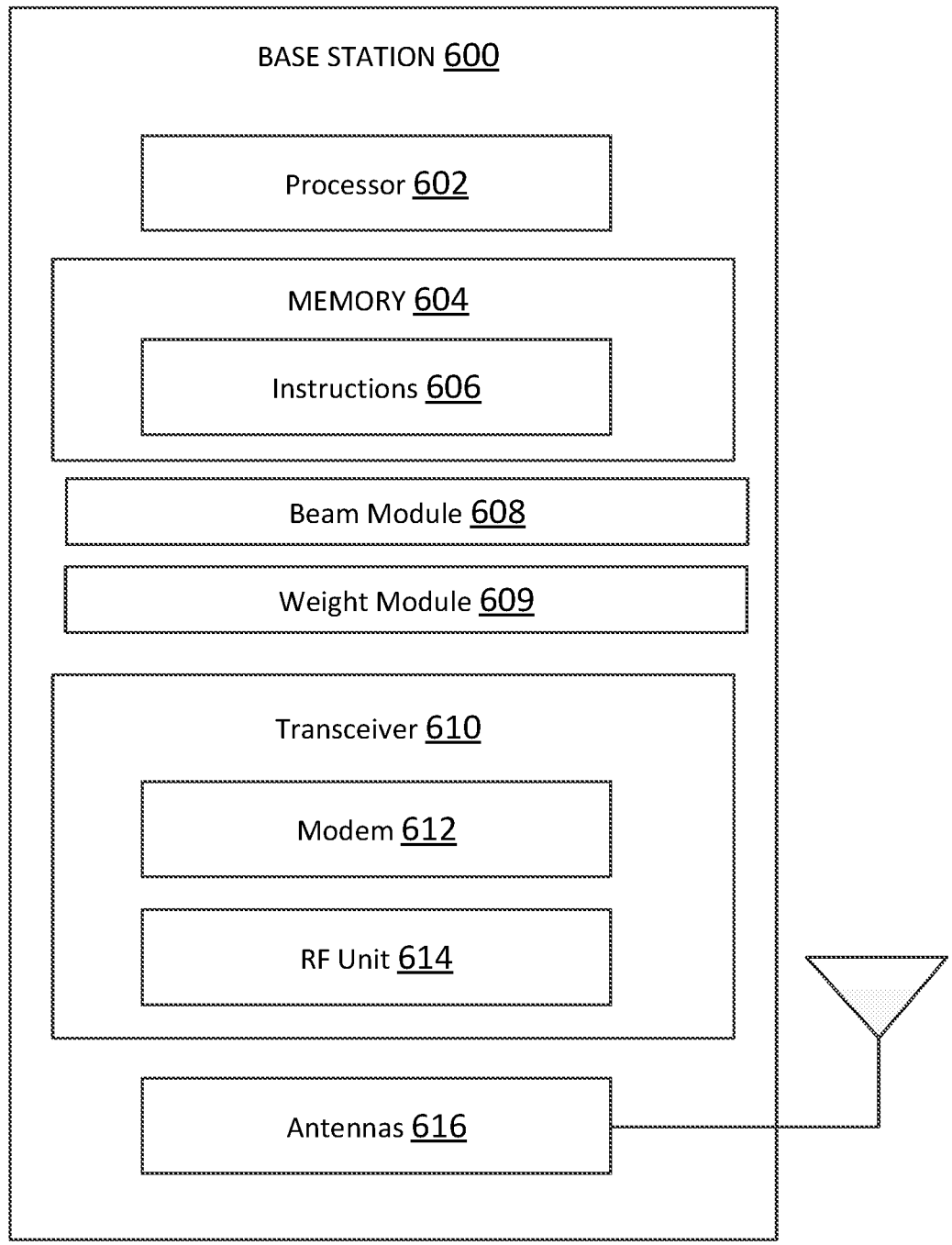
FIG. 6 illustrates a block diagram of an exemplary base station (BS) according to embodiments of the present disclosure.

FIG. 6 illustrates a block diagram of an exemplary BS 600 according to embodiments of the present disclosure. The BS 600 may be a BS 105, 205, 305, or 405 as discussed above. A shown, the BS 600 may include a processor 602, a memory 604, a beam module 608, a weight module 609, a transceiver 610 including a modem subsystem 612 and a RF unit 614, and an antenna 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 604 may include a non-transitory computer-readable medium. The memory 604 may store instructions 606. The instructions 606 may include instructions that, when executed by the processor 602, cause the processor 602 to perform operations described herein. Instructions 606 may also be referred to as code, which may be interpreted broadly to include any type of computer-readable statement(s) as discussed above with respect to FIG. 5.

The beam module 608 and/or weight module 609 may be used for various aspects of the present disclosure. For example, the beam module 608 is configured to communicate UL-DL beam reciprocity information. In one example, the beam module 609 is configured to select a beam and then transmit the UL-DL beam reciprocity information after the beam selection. In an example, beam module 608 requests the UE for a beam refinement procedure. The beam selection may refer to the BS's selection of the beam 226c in FIG. 2B, where the beam 226c is associated with the beam selection. The beam module 608 is configured to transmit a plurality of DL beam reference signals based on a beam selection for a beam weight adjustment. In an example, the beam module 608 transmits the plurality of DL beam reference signals to the UE so that the UE may perform the techniques discussed in the present disclosure to determine the best beam for UL transmission. The beam module 608 is configured to receive an UL reference signal beamformed based on the beam weight adjustment and the UL-DL beam reciprocity information. In an example, the UE uses an improved beam for transmission of the UL reference signal, using the techniques discussed in the present disclosure.

The weight module 609 is configured to adjust a plurality of weights for the antenna array based on the UL reference signal. In an example, the weight module 609 uses the UL reference signal to determine an improved beam weight as discussed in the disclosure. The beam module 608 is configured to transmit a DL communication signal using a transmission beam configured based on the adjusted plurality of weights. In an example, the beam module 608 transmits the DL communication signal using the improved beam determined by the weight module 609.

As shown, the transceiver 610 may include the modem subsystem 612 and the RF unit 614. The transceiver 610 can be configured to communicate bi-directionally with other devices, such as the UEs 115, 215, 315, and 415 and/or another core network element. The modem subsystem 612 may be configured to modulate and/or encode data according to a MCS, e.g., a LDPC coding scheme, a turbo coding scheme, a convolutional coding scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 115. Although shown as integrated together in transceiver 610, the modem subsystem 612 and the RF unit 614 may be separate devices that are coupled together at the BS 105 to enable the BS 105 to communicate with other devices.

The RF unit 614 may provide the modulated and/or processed data, e.g. data packets (or, more generally, data messages that may contain one or more data packets and other information), to the antenna 616 for transmission to one or more other devices. This may include, for example, transmission of information to complete attachment to a network and communication with a camped UE 102 according to embodiments of the present disclosure. The antenna 616 may further receive data messages transmitted from other devices and provide the received data messages for processing and/or demodulation at the transceiver 610. Although FIG. 6 illustrates antenna 616 as a single antenna, antenna 616 may include multiple antennas of similar or different designs in order to sustain multiple transmission links.

Figure 7:
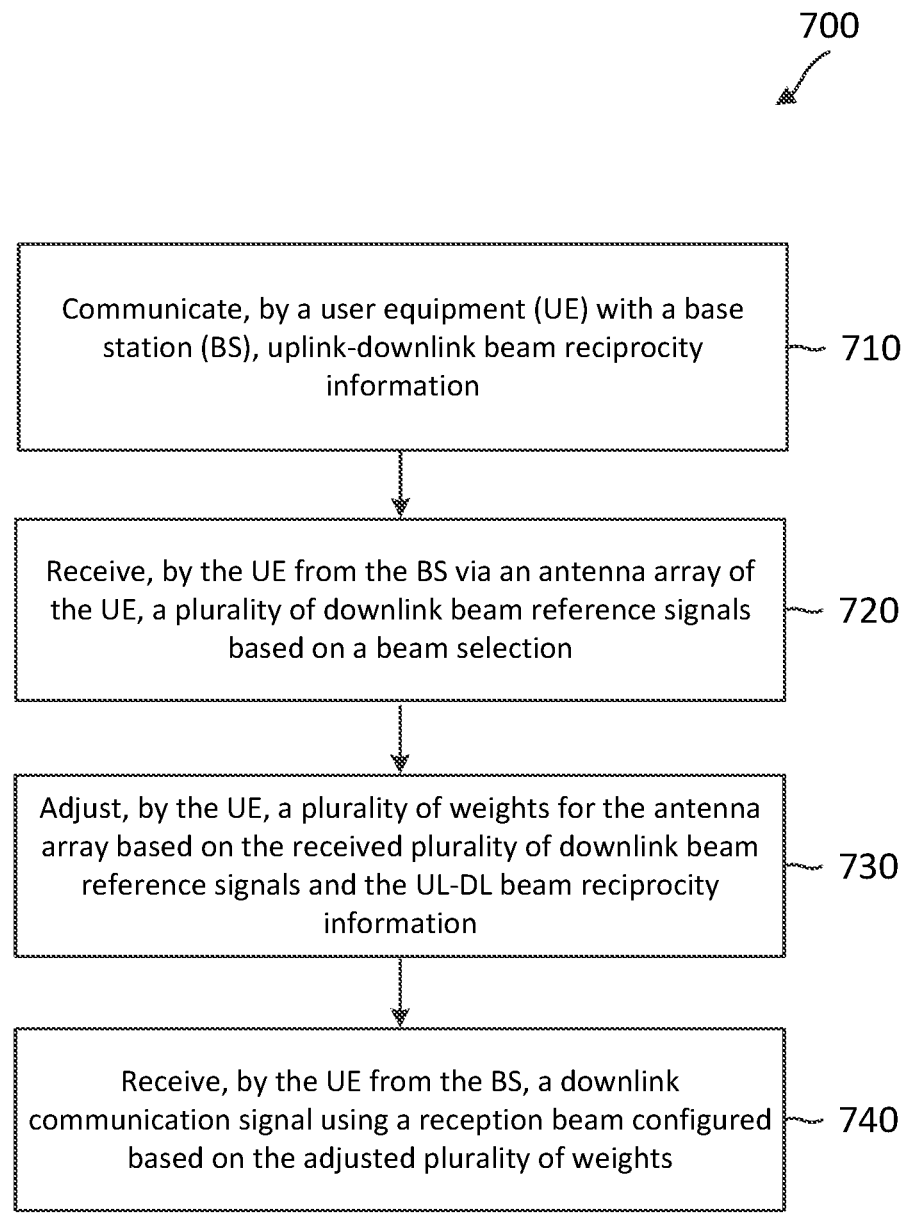
FIG. 7 is a flow diagram of a method of wireless communication according to embodiments of the present disclosure.

FIG. 7 is a flow diagram of a method 700 of wireless communication according to embodiments of the present disclosure. Steps of the method 700 can be executed by a computing device (e.g., a processor, processing circuit, and/or other suitable component) of a wireless communication device, such as the UEs 115, 215, 315, 415, and 500. For example, the UE 500, may utilize one or more components, such as the processor 502, the memory 504, the beam module 508, the weight module 509, and/or the transceiver 510, to execute the steps of method 700. The method 700 includes a number of enumerated steps, but embodiments of the method 700 may include additional steps before, after, and in between the enumerated steps. In some embodiments, one or more of the enumerated steps may be omitted or performed in a different order.

At step 710, the method 700 includes communicating, by a UE with a BS, uplink-downlink beam reciprocity information. In an example, the UE transmits UL-DL beam reciprocity information after a beam selection to the BS. The UE may provide feedback to the BS regarding whether the UE has reciprocity on the DL-UL channels. Means for performing the functionality of step 710 can, but not necessarily, include, for example, beam module 508, transceiver 510, antennas 516, processor 502, and/or memory 504 with reference to FIG. 5.

At step 720, the method 700 includes receiving, by the UE from the BS via an antenna array of the UE, a plurality of downlink beam reference signals based on a beam selection. The beams associated with the same subarray that the UE selected in relation to FIG. 2C may be further improved. The BS may select its fixed beam f, which the BS uses to transmit the plurality of downlink beam reference signals. Means for performing the functionality of step 720 can, but not necessarily, include, for example, transceiver 510, antennas 516, processor 502, and/or memory 504 with reference to FIG. 5.

At step 730, the method 700 includes adjusting, by the UE, a plurality of weights for the antenna array based on the received plurality of downlink beam reference signals and the UL-DL beam reciprocity information. In an example, the UE uses the plurality of downlink beam reference signals to determine an improved beam weight as discussed in the disclosure. In an example, adjusting the plurality of weights includes determining, by the UE, an RSRP based on a set of weights for each of the plurality of DL beam reference signals and selecting, by the UE, a set of weights corresponding to a first RSRP greater than a second RSRP. For example, the plurality of weights may be adjusted in relation to the RSRP for the training beams, an amplitude or phase adjustment, etc. Means for performing the functionality of step 730 can, but not necessarily, include, for example, weight module 509, transceiver 510, antennas 516, processor 502, and/or memory 504 with reference to FIG. 5.

At step 740, the method 700 includes receiving, by the UE from the BS, a downlink communication signal using a reception beam configured based on the adjusted plurality of weights. In an example, the UE transmits an SRS to the beam, where the DL communication signal beamformed based on the SRS. Means for performing the functionality of step 740 can, but not necessarily, include, for example, transceiver 510, antennas 516, processor 502, and/or memory 504 with reference to FIG. 5.

Figure 8:
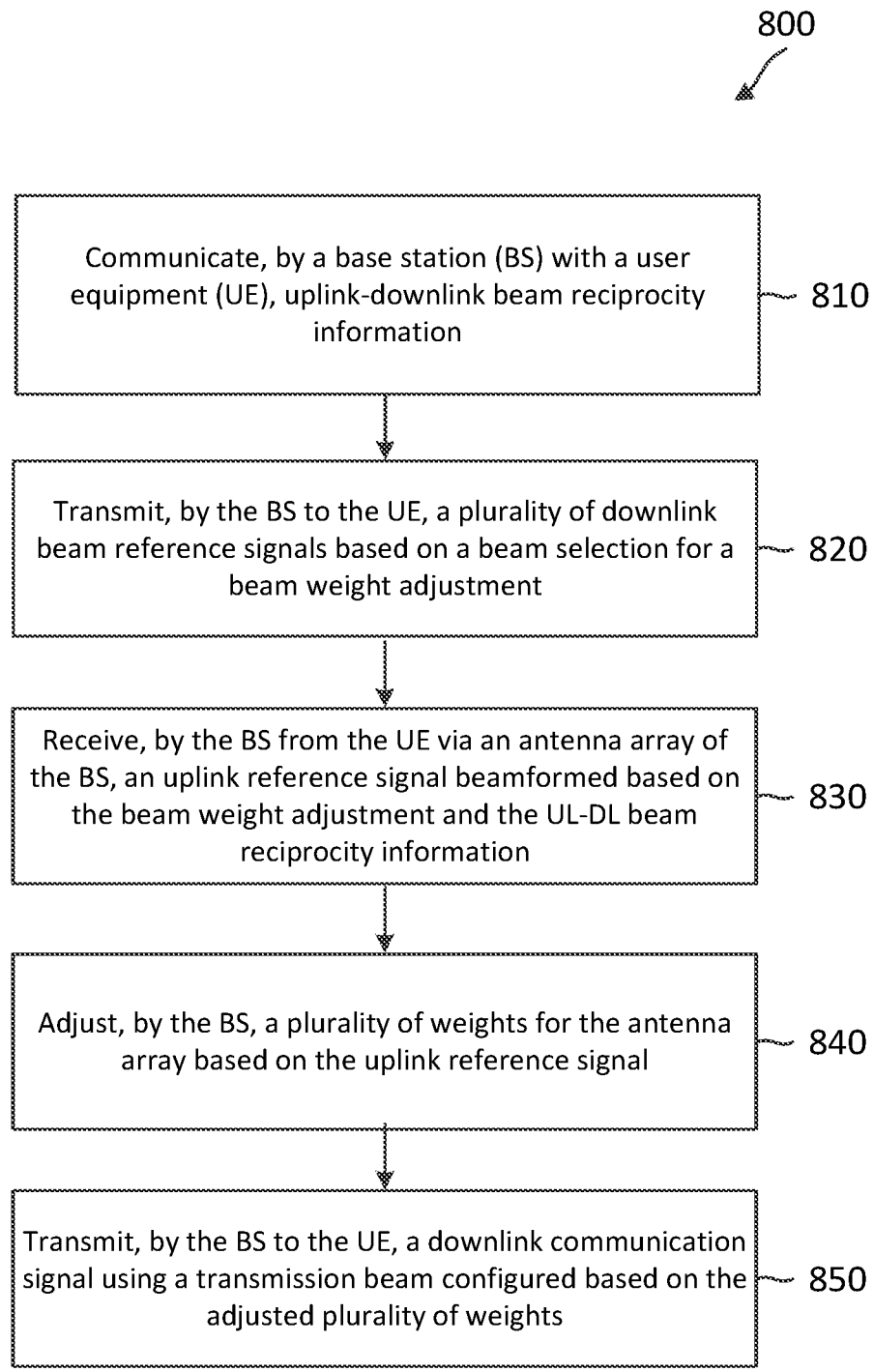
FIG. 8 is a flow diagram of a method of wireless communication according to embodiments of the present disclosure.

FIG. 8 is a flow diagram of a method 800 of wireless communication according to embodiments of the present disclosure. Steps of the method 800 can be executed by a computing device (e.g., a processor, processing circuit, and/or other suitable component) of a wireless communication device, such as the BSs 105, 205, 305, 405, and 600. For example, the BS 600, may utilize one or more components, such as the processor 602, the memory 604, the beam module 608, the weight module 609, and/or the transceiver 610, to execute the steps of method 800. As illustrated, the method 800 includes a number of enumerated steps, but embodiments of the method 800 may include additional steps before, after, and in between the enumerated steps. In some embodiments, one or more of the enumerated steps may be omitted or performed in a different order.

At step 810, the method 800 includes communicating, by a base station (BS) with a user equipment (UE), uplink-downlink beam reciprocity information. In one example, the communicating of the UL-DL beam reciprocity information occurs after a beam selection. The beam selection may refer to the BS's selection of the beam 226c in FIG. 2B. In an example, beam module 608 requests the UE for a beam refinement procedure. In another example, beam module 608 assists the UE in performing the beam refinement procedure. Means for performing the functionality of step 810 can, but not necessarily, include, for example, beam module 608, transceiver 610, antennas 616, processor 602, and/or memory 604 with reference to FIG. 6.

At step 820, the method 800 includes transmitting, by the BS to the UE, a plurality of downlink beam reference signals based on a beam selection for a beam weight adjustment. In an example, the BS transmits the plurality of DL beam reference signals to the UE so that the UE may perform the techniques discussed in the present disclosure to determine the best beam for UL transmission. Means for performing the functionality of step 820 can, but not necessarily, include, for example, beam module 608, transceiver 610, antennas 616, processor 602, and/or memory 604 with reference to FIG. 6.

At step 830, the method 800 includes receiving, by the BS from the UE via an antenna array of the BS, an uplink reference signal beamformed based on the beam weight adjustment and the UL-DL beam reciprocity information. In an example, the UE uses its improved beam for transmission of the UL reference signal and the BS receives the uplink reference signal beamformed based on the beam weight adjustment applied at the UE side. Means for performing the functionality of step 830 can, but not necessarily, include, for example, beam module 608, transceiver 610, antennas 616, processor 602, and/or memory 604 with reference to FIG. 6.

At step 840, the method 800 includes adjusting, by the BS, a plurality of weights for the antenna array based on the uplink reference signal. In an example, the BS uses the UL reference signal to determine an improved beam weight as discussed in the disclosure. In an example, the BS may determine the improved beam weight that matches with the $g_{opt}$ determined by the UE. In an example, adjusting the plurality of weights includes determining, by the BS, an RSRP based on a set of weights for the UL reference signal and selecting, by the BS, a set of weights corresponding to a first RSRP greater than a second RSRP. Means for performing the functionality of step 840 can, but not necessarily, include, for example, weight module 609, transceiver 610, antennas 616, processor 602, and/or memory 604 with reference to FIG. 6.

At step 850, the method 800 includes transmitting, by the BS, a DL communication signal using a transmission beam configured based on the adjusted plurality of weights. In an example, the BS transmits the DL communication signal using the improved beam determined by the BS. Means for performing the functionality of step 850 can, but not necessarily, include, for example, beam module 608, transceiver 610, antennas 616, processor 602, and/or memory 604 with reference to FIG. 6.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   transmitting, by a user equipment (UE) to a base station (BS), a capability report indicating non-reciprocity between a downlink (DL) channel and an uplink (UL) channel;
   receiving, by the UE from the BS via an antenna array of the UE, a plurality of DL beam reference signals based on a selected DL receive beam;
   adjusting, by the UE, a plurality of weights for the antenna array based on the received plurality of DL beam reference signals and the capability report indicating non-reciprocity between the DL channel and the UL channel; and
   transmitting, by the UE to the BS, a UL communication signal using a transmission beam configured based on the plurality of weights adjusted based on the received plurality of DL beam reference signals.

2. The method of claim 1, wherein transmitting the capability report comprises transmitting the capability report after selection of the selected DL receive beam by the BS.

3. The method of claim 1, further comprising:
   selecting, by the UE, the selected DL receive beam, wherein transmitting the capability report comprises transmitting the capability report after selection of the selected DL receive beam.

4. The method of claim 1, wherein adjusting the plurality of weights includes determining a received signal power based on a set of weights for each of the plurality of DL beam reference signals and selecting a set of weights corresponding to a first received signal power greater than a second received signal power.

5. The method of claim 1, wherein adjusting the plurality of weights includes adjusting the plurality of weights based on an amplitude difference between the UL channel and the DL channel.

6. The method of claim 1, wherein adjusting the plurality of weights includes adjusting the plurality of weights based on a phase difference between the UL channel and the DL channel.

7. The method of claim 1, wherein the plurality of DL beam reference signals are in a same beam direction.

8. A method of wireless communication, comprising:
   receiving, by a base station (BS) from a user equipment (UE), a capability report indicating non-reciprocity between a downlink (DL) channel and an uplink (UL) channel;
   transmitting, by the BS to the UE, a plurality of DL beam reference signals based on a selected DL transmit beam to enable a beam weight adjustment;
   receiving, by the BS from the UE via an antenna array of the BS, a UL reference signal beamformed based on the beam weight adjustment and the capability report indicating non-reciprocity between the DL channel and the UL channel;
   adjusting, by the BS, a plurality of weights for the antenna array based on the UL reference signal; and
   transmitting, by the BS to the UE, a DL communication signal using a transmission beam configured based on the plurality of weights adjusted based on the received UL reference signal.

9. The method of claim 8, further comprising sending a request for a beam refinement procedure.

10. The method of claim 8, further comprising:
    selecting, by the BS, the selected DL transmit beam, wherein receiving the capability report comprises receiving the capability report after selecting the selected DL transmit beam.

11. The method of claim 8, wherein adjusting the plurality of weights includes determining a received signal power based on a set of weights for the UL reference signal and selecting a set of weights corresponding to a first received signal power greater than a second received signal power.

12. The method of claim 8, wherein adjusting the plurality of weights includes adjusting the plurality of weights based on an amplitude difference between the UL channel and the DL channel.

13. The method of claim 8, wherein adjusting the plurality of weights includes adjusting the plurality of weights based on a phase difference between the UL channel and the DL channel.

14. A user equipment (UE) comprising:
    a memory;
    a transceiver in communication with an antenna array; and
    a processor, in communication with the memory and the transceiver, configured to:
    transmit, by the UE to a base station (BS), a capability report indicating non-reciprocity between a downlink (DL) channel and an uplink (UL) channel;
    receive, by the UE from the BS via the antenna array, a plurality of DL beam reference signals based on a selected DL receive beam;
    adjust, by the UE, a plurality of weights for the antenna array based on the received plurality of DL beam reference signals and the capability report indicating non-reciprocity between the DL channel and the UL channel; and
    transmit, by the UE to the BS, via the transceiver, a UL communication signal using a transmission beam configured based on the plurality of weights adjusted based on the received plurality of DL beam reference signals.

15. The UE of claim 14, wherein the capability report indicating non-reciprocity between the DL channel and the UL channel comprises the capability report indicating circuit differences between the UL channel and the DL channel.

16. The UE of claim 14, wherein capability report indicating non-reciprocity between the DL channel and the UL channel comprises the capability report indicating impedance differences between the UL channel and the DL channel.

17. The UE of claim 14, wherein the processor is configured to adjust the plurality of weights by determining a received signal power based on a set of weights for each of the plurality of DL beam reference signals and selecting a set of weights corresponding to a first received signal power greater than a second received signal power.

18. The UE of claim 17, wherein the processor is further configured to receive, via the transceiver, a set of offline designed beams over a contiguous series of symbols and record at least the first received signal power and the second received signal power over the contiguous series of symbols.

19. The UE of claim 14, wherein the processor is configured to adjust the plurality of weights by adjusting the plurality of weights based on an amplitude difference between the UL channel and the DL channel.

20. The UE of claim 14, wherein the processor is configured to adjust the plurality of weights based on a phase difference between the UL channel and the DL channel.

21. The UE of claim 14, wherein the plurality of DL beam reference signals are in a same beam direction.

22. The UE of claim 14, wherein the processor is further configured to select the selected DL receive beam and to transmit the capability report after selecting the DL receive beam.

23. A base station (BS) comprising:
a memory;
a transceiver in communication with an antenna array; and
a processor, in communication with the memory and the transceiver, configured to:
receive, by a base station (BS) from a user equipment (UE), a capability report indicating non-reciprocity between a downlink (DL) channel and an uplink (UL) channel;
transmit, by the BS to the UE, via the transceiver, a plurality of DL beam reference signals based on a selected DL transmit beam to enable a beam weight adjustment;
receive, by the BS from the UE via the antenna array, a UL reference signal beamformed based on the beam weight adjustment and capability report indicating non-reciprocity between the DL channel and the UL channel;
adjust, by the BS, a plurality of weights for the antenna array based on the UL reference signal; and
transmitting, by the BS to the UE, a DL communication signal using a transmission beam configured based on the plurality of weights adjusted based on the received UL reference signal.

24. The BS of claim 23, wherein the processor is further configured to transmit, via the transceiver, a request for a beam refinement procedure.

25. The BS of claim 23, wherein the processor is further configured to select the DL transmit beam.

26. The BS of claim 23, wherein the processor is further configured to determine a received signal power based on a set of weights for the UL reference signal.

27. The BS of claim 26, wherein the processor is further configured to select a set of weights corresponding to a first received signal power greater than a second received signal power.

28. The BS of claim 23, wherein the processor is configured to adjust the plurality of weights based on an amplitude difference between the UL channel and the DL channel.

29. The BS of claim 23, wherein the processor is configured to adjust the plurality of weights based on a phase difference between the UL channel and the DL channel.

\* \* \* \* \*